United States Patent [19]

De Poortere et al.

[11] 4,070,259

[45] Jan. 24, 1978

[54] RADIOCURABLE COMPOSITIONS

[75] Inventors: Michel De Poortere, Brussels; Paul Dufour, Ruisbroek; August Vrancken, Dworp, all of Belgium

[73] Assignee: U C B, Societe Anonyme, Bruselles, Belgium

[21] Appl. No.: 600,196

[22] Filed: July 29, 1975

[30] Foreign Application Priority Data

Aug. 29, 1974 Belgium .................................. 16150

[51] Int. Cl.$^2$ ........................... C08F 2/48; C08F 2/50; C08F 2/46
[52] U.S. Cl. .......................... 204/159.16; 204/159.15; 204/159.22; 204/159.23; 560/126; 560/127
[58] Field of Search ....................... 260/486 R, 468 K; 260/468L; 204/159.22, 159.23, 159.16, 159.15

[56] References Cited

U.S. PATENT DOCUMENTS

| 3,770,491 | 11/1973 | Spoor et al. ..................... 204/159.22 |
| 3,840,448 | 10/1974 | Osborn et al. ................... 204/159.22 |
| 3,840,449 | 10/1974 | Furukawa et al. ............... 204/159.22 |
| 3,888,830 | 6/1975 | Ogasawara et al. .............. 260/486 R |

Primary Examiner—Allan Lieberman
Attorney, Agent, or Firm—Wenderoth, Lind & Ponack

[57] ABSTRACT

Radiocurable compositions of matter consisting essentially of Diels-Alder reaction products between (A) at least one dienophile containing at least two double bonds $>C=C<$, at least one of which derives from acrylic acid and (B) at least one linear or cyclic diene containing at least two conjugated olefinic double bonds, the preparation thereof and sealers, adhesives, paints, varnishes and inks formulated therewith.

19 Claims, No Drawings

RADIOCURABLE COMPOSITIONS

The present invention is related to new radiocurable compositions of matter, to the preparation thereof and to sealers, adhesives, paints, varnishes and inks formulated therewith.

The radiocurable compositions of matter according to the invention are Diels-Alder reaction products between A at least one dienophile containing at least two double bonds >C=C<, at least one of which derives from acrylic acid, said dienophile having the general formula (I)

$$Z-CH=CH-COOY(OCOCH=CH_2)_n \quad (I)$$
$$\quad\quad\quad\quad\quad\quad\quad\quad |$$
$$\quad\quad\quad\quad\quad\quad\quad\quad (OH)_x$$

wherein
Z is hydrogen, methyl, phenyl, cyano, chlorine or COOR, R being hydrogen, alkyl, cycloalkyl, aryl, haloalkyl, halocycloalkyl, haloaryl or

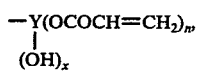
$$-Y(OCOCH=CH_2)_m$$
$$\quad\quad |$$
$$\quad\quad (OH)_x$$

Y is the radical of a polyhydric compound having a molecular weight lower than 3000 containing 2 to 6 hydroxyl groups, at least two of which are esterified, or the same polyhydric compound having a nitrogen, silicon or phosphorus atom,
n is 1 to 5, and
x is 0 to 4, and B. at least one linear or cyclic diene containing at least two conjugated olefinic double bonds having the general formula (II)

$$W-CH=CH-CH=CH-X \quad (II)$$

wherein
W and X are each an independent aliphatic hydrocarbon radical, an aliphatic hydrocarbon radical containing conjugated or non conjugated olefinic double bonds or an aliphatic hydrocarbon radical containing hydroxyl or carbonyl groups; either W or X containing a carboxyl group, or W and X constitute a single divalent hydrocarbon radical, the two ends of which being attached to the 1 and 4 positions of the —CH=CH—CH=CH— chain, to form a ring, said ring being unsubstituted or carrying alkyl or cycloalkyl radicals or a carboxyl group.

DIENOPHILE.

If the general formula (I) of the dienophile is examined, it can be seen that this represents the ester of an acid Z—CH=CH—COOH with an acrylyl alcohol $$OH-Y(OCOCH=CH_2)_n$$
$$\quad\quad |$$
$$\quad\quad (OH)_x$$

When Z is H, methyl, phenyl, cyano or chloro,, the dienophile is respectively an acrylate, methacrylate, phenylacrylate, cyanoacrylate or chloroacrylate of the acrylyl alcohol $$OH-Y(OCOCH=CH_2)_n.$$
$$\quad\quad |$$
$$\quad\quad (OH)_x$$

Whereas when Z is a COOR group, wherein R is H, alkyl, cycloalkyl, aryl, haloalkyl, halocycloalkyl, haloaryl or $$-Y(OCOCH=CH_2)_m$$
$$\quad\quad |$$
$$\quad\quad (OH)_x$$

the dienophile is either (a) a maleic or fumaric acid monoester of the acrylyl alcohol $$OH-Y(OCOCH=CH_2)_n$$
$$\quad\quad |$$
$$\quad\quad (OH)_x$$

when R = H, or (b) a maleic or fumaric acid diester of both the acrylyl alcohol $$OH-Y(OCOCH=CH_2)_n$$
$$\quad\quad |$$
$$\quad\quad (OH)_x$$

and a hydroxyl group-containing, alkyl, cycloalkyl, aryl, haloalkyl, halocycloalkyl, haloaryl or compound $$-Y(OCOCH=CH_2)_n$$
$$\quad\quad |$$
$$\quad\quad (OH)_x$$

Examples of hydroxyl group-containing alkyl compounds; include methanol, ethanol, propanol, isopropanol, butanol, isobutanol, tert.-butanol, and the like.

Examples of hydroxyl group-containing cycloalkyl compounds include cyclohexanol, methyl-cyclohexanol, and the like.

Examples of hydroxyl group-containing haloalkyl compounds; include phenol, cresol, xylenol, alpha- or beta-naphtol and the like.

Examples of hydroxylated compounds of haloalkyl are glycol chlorohydrin, 1,2-chloropropanol and the like.

Examples of hydroxyl group-containing halocycloalkyl compounds; are chlorine and/or bromine derivatives of cyclohexanol and the like.

Examples of hydroxyl group-containing haloaryl compounds; are chlorine and bromine derivatives of phenol, naphthol and the like.

As to the acrylyl cmpound HO $$-Y(OCOCH=CH_2)_m$$
$$\quad\quad |$$
$$\quad\quad (OH)_x$$

this is the partial esterification product of a polyhydric compound containing $n+x+1$ hydroxyl groups with $n$ moles of acrylic acid, such as ethylene glycol monoacrylate ($n=1$, $x=0$); glycerol diacrylate ($n=2$, $x=0$), pentaerythritol monoacrylate ($n=1$, $x=2$), pentaerythritol diacrylate ($n=2$, $x=1$), pentaerythritol tricarylate ($n=3$, $x=0$), and the like.

Examples of the dienophiles of the general formula (I) include:

Esterification products of eventually substituted acrylic acid with aliphatic monomer polyols, such as 1,4-butanediol diacrylate, ethylene glycol diacrylate, trimethylolpropane diacrylate, pentaerythritol diacrylate, pentaerythritol triacrylate, pentaerythritol triacrylate beta-cyanoacrylate, pentaerythritol tetraacrylate, and the like;

Esterification products of acrylic acid with polyhydric polyesters or polyethers. These polyesters or polyethers may be of two types: thus, they may result from the addition of ethylene oxide, propylene oxide or δ-caprolactone on polyalcohols or polyamines (ethylene glycol, glycerol, trimethylolpropane, pentaerythritol, sorbitol, ethylene diamine, and the like). Oxyalkylene polyesters or polyethers of this kind are commercially available (TERCAROL sold by Societe Chimique de Tertre, Belgium; PLURACOL and QUADROL sold by Pechiney-Ugine-Kuhlmann, France; NIAX POLYOLS, sold by Union Carbide Corp., U.S.A.). An example of an acrylate of this type is TERCAROL G 310 triacrylate. The polyethers may also result from the polyetherification of aliphatic monomer polyols. An example of an acrylate of this type is dipentaerythritol hexaacrylate;

Esterification products of acrylic acid with polyhydric polyesters obtained by co-esterification of mono- and/or polycarboxylic acids (or their anhydrides) with polyhydric compounds (polyols). Among the acids (or anhydrides) mention is made of maleic anhydride, fumaric acid, adipic acid, dimer and trimer fatty acids, phthalic anhydride, trimellitic anhydride, tetrachlorophthalic anhydride, HET acid, pyromellitic anhydride, the dianhydride of benzophenon-3,3',4,4'-tetracarboxylic acid and the like. Among the polyols, mention is made of ethylene glycol, glycerol, pentaerythritol, sorbitol, neopentylglycol, trimethylpentane diol, bis-oxyethylated octachlorodiphenol, oxyethylated or oxypropylated; bisphenol A, and the like. Examples of dienophiles of this family are the esterification product of acrylic acid with a mixture of butane-diol, trimethylol-propane and adipic acid in the molar ratio 4:1:2:2, the esterification product of a mixture of acrylic acid, fumaric acid, a $C_{36}$ dimer fatty acid and/or $C_{54}$ trimer fatty acid, neopentyl glycol and pentaerythritol in the molar ratio 6:1:1:1:2, or the esterification product of adipic acid, pentaerythritol and acrylic acid in the molar ration 1:2:6 to obtain the bis-triacrylyl pentaerythritol adipate; Unsaturated oligomers and polymers obtained by the esterification of acrylic acid with semi-telechelic acrylic copolymers carrying hydroxyl groups, the molecular weight of which is lower than 3000 (e.g. a butyl acrylic-/ethyl acrylate/2-hydroxyethyl acrylate/2-mercaptoethanol copolymer in the molar ratio 8.8:4.9:3.5:0.7). Another example of an unsaturated polyacrylate of this type is the esterification product with acrylic acid of the OH-terminated copolymer ethyl acrylate/hydroxyethyl acrylate/2-mercaptoethanol in the molar ratio 80.1:15.4:4.4; Unsaturated oligomers and polymers obtained by reacting hydroxyalkyl acrylate (e.g. 2-hydroxyethyl acrylate) with the addition product of an aliphatic or aromatic diisocyanate (e.g. hexamethylenediisocyanate, 2,4- and/or 2,6-toluylene-diisocyanate) on semi-telechelic acrylic copolymers carrying hydroxyl groups of the kind described in the preceding paragraph; these semi-telechelic copolymers, which contain a terminal double bond and one or more lateral double bonds are described in the copending U.S. Patent application Ser. No. 517,822, filed on Oct. 24, 1974, in name of A. VRANCKEN and P. DUFOUR.

Unsaturated derivatives of polyurethane-polyols obtained by the addition of polyether- or polyester-polyols on hydroxyl group-containing acrylic monomers by means of aliphatic or aromatic diisocyanates. An example thereof is the addition product of 1 mole of TERCAROL G 310 (addition product of 3 moles propylene oxide on 1 mole glycerol having a molecular weight of about 310) with 3 moles toluylene-diisocyanate and 3 moles 2-hydroxyethyl acrylate;

beta Hydroxyl group-containing unsaturated polyesters obtained by reacting acrylic acid with organic compounds containing glycidyl groups, for example the diglycidyl ester of a fatty acid or adipic acid, epoxdized vegetable oils, diglycidyl ether of the polyether obtained by reacting epichlorohydrin with 2,2-bis(4-hydroxyphenyl) propane, epoxydized novolac resins. Examples of this family are the acrylates of the diglycidyl ether of 2,2-bis-(4-hydroxyphenyl)-propane (bisphenol A), the rings of which may be chlorinated or brominated.

Diacrylates of polyoxyethylated or polyoxypropylated 2,2-bis-(4-hydroxyphenyl)-propane, such as the diacrylates of DIANOL-22 or DIANOL-33 (The DIANOLS are sold by AKZO, Netherlands);

Reaction products of hydroxyalkyl acrylate with alkylene (or arylene) glycol bis-chloroformate, such as the reaction product of hydroxyethyl acrylate with diethylene glycol bis-chloroformate to obtain diethylene glycol bis-(2-acryloxyethylcarbonate) or the reaction product of hydroxyethyl acrylate with bisphenol A bis-chloroformate;

Acrylyl polysiloxanes, such as those described in U.S. Pat. specification No. 3,437,513;

Acrylyl derivatives of tertiary amines, such as N-methyl-diethanolamine diacrylate, triethanolamine triacrylate, the esterification product of 2 moles acrylic acid and 1 mole beta-dimethylaminopropionic acid with 1 mole trimethylolpropane, i.e. trimethylolpropane beta-dimethylaminopropanoate diacrylate, and the like;

Phosphorus compounds containing acrylic groups, such as the addition products of $PCl_3$, $PCl_5$ or $P_2O_5$ on hydroxyalkyl acrylates giving acryloxyalkyl phosphites and phosphates, such as tris-(2-acryloxyethyl) phosphite and tris-(2-acryloxyethyl) phosphate;

as well as the reaction products of any of the abovementioned acrylates (substituted or not) having at least one residual free OH group with maleic acid (which may subsequently be at least partially isomerized into the corresponding fumarate), fumaric acid or mixtures of these acids hydroxy group-containing compounds of alkyl, cycloalkyl, aryl, haloalkyl, halocycloalkyl or haloaryl compounds.

DIENE.

As examples of dienes of general formula (II), where W and X constitute with the conjugated double bonds system —CH=CH—CH=CH—an aliphatic compound, mention may be made in general way of all the fatty acids which contain at least two conjugated double bonds.

As examples of acids containing only two conjugated double bonds, there may be mentioned sorbic acid (or 2,4-hexadienoic acid), 2,4-decadienoic acid, 2,4-dodecadienoic acid, 9,11- or 10,12-octadecadienoic acid.

As examples of acids containing a non-conjugated double bond in addition to the two conjugated double bonds, mention is made of 9,12,14- and 10,12,15-octadecatrienoic acids.

As examples of acids with three conjugated double bonds, there may be mentioned 8,10,12- or 9,11,13-octadecatrienoic acids, the cis, trans,trans and trans,- trans,trans isomers of which are respectively known as alpha- and beta-eleostearic acids.

cording to the well known Diels-Alder reaction to obtain compounds having the general formula (III):

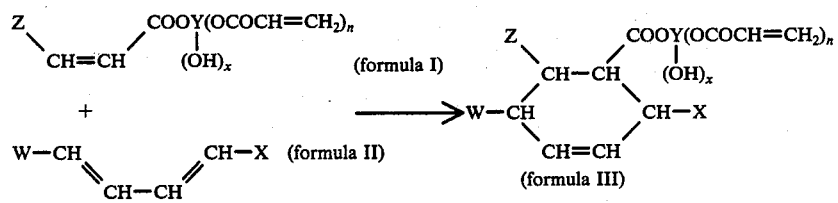

As examples of acids with four conjugated double bonds, there is the 9,11,13,15-octadecatetraenoic acid.

As mentioned above in the definition of W and X in the dienes of general formula (II), the diene compound may contain, in addition to a carboxyl group, other functional groups such as hydroxyl groups or carbonyl groups, which is in particular the case for the 9,14-dihydroxy-10,12-octadecadienoic acid, the 18-hydroxy-9,11,13-octadecatrienoic acid and the 4-oxo-9,11,13-octadecatrienoic acid, the isomers of which are known as the alpha- and beta-licanic acids obtained by the hydrolysis of oiticica oil.

Instead of the unsaturated acids, use may be made of their esters, alkyd resins containing them, urethanized aralkyds and alkyds containing them, as well as the mono-, di- and triglycerides thereof such as found in certain natural oils, such as stillingia oil, chinawood oil (tung oil), Jacaranda mimosifolia oil, Calendula officinalis oil, Momordicabalsamina oil, Catalpa ovata oil, Parinarium oil and oiticica oil. Use may also be made of certain oils which do not contain conjugated double bonds in the natural state but in which conjugated double bonds can be introduced by a chemical treatment, as is for example the case for castor oil, which is subjected to a dehydration treatment and linseed oil, which is subjected to a treatment with a base.

More details on fatty acids containing conjugated double bonds or their derivatives can be found in K.S. MARKLEY's book "Fatty Acids", Interscience, volume 1, pages 23 to 249 (1960) and volume 5, pages 3133 to 3285 (1968).

As examples of dienes of the general formula (II), wherein W and X constitute together with the conjugated double bonds —CH=CH—CH=CH— a cyclic (or polycyclic) compound, mention may be made of cyclic terpenes containing conjugated double bonds, such as those mentioned in J.L. SIMONSEN's book "The Terpenes", 2nd edition, University Press, Cambridge 1947. One of the most interesting cyclic diene compounds from the practical point of view is levopimaric acid, which is derived from abietic acid extracted from rosin.

DIELS-ALDER COMPOSITIONS

Due to the presence of the conjugated double bonds system in the diene of formula (II) and the presence of double bonds in the dienophile of formula (I), these compounds can be made to react with each other acbesides eventually a minor amount of a product having the structure (IV), which is formed by the reaction of two or more moles of the diene with one mole of the dienophile:

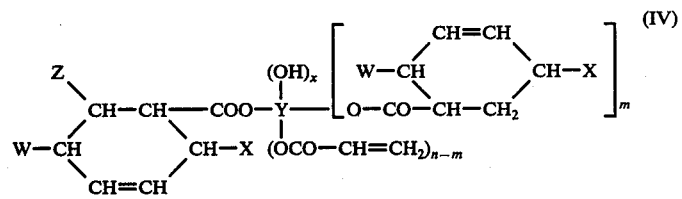

the symbols W, X, Y, Z, $n$ and $x$ having the same meanings as given above and $m$ being a whole number lower or equal to $n$.

As the compound of structure (IV) is less useful than the compound of formula (III), because the former contains less photopolymerizable double bonds and because the cyclic double bonds practically do not take part in photopolymerization, the formation of compound (IV) is avoided as much as possible. It has been found that the amount of compound (IV) decreases with increase in the relative amount of the dienophile used in the reaction. This is why, according to the invention, the molar ratio of diene to dienophile used to advantageously 1:1 to 1:10, preferably 1:3 to 1:9.

Thus, the obtained radiocurable composition according to the invention is a mixture of at least one Diels-Alder compound of the formula (III) with an amount of at least one dienophile of formula (I), which if preferably higher than would have been necessary for the dienedienophile stoichiometry, the amount of compound of structure (IV) decreasing with increase of amount of dienophile (I) used.

When for economic reasons, it is not desired to use too great an excess of dienophile of formula (I) (this being generally an expensive product), it is possible, according to the invention to adopt one of the following three solutions:

a. Amongst the dienophiles to be used according to the invention, those that have the greatest reactivity in the Diels-Alder reaction are selected. This is for example the case with dienophiles which, in addition to the unsaturation of the acrylic radicals, contain the unsaturation of the maleic of fumaric acid radical, the increase in reactivity following the scheme:

, maleic — acrylic — fumaric.

An example of a very reactive dienophile according to the invention is triacrylyloxypentaerythritol monofumarate; this is prepared from pentaerythritol triacrylate and either fumaric acid or maleic anhydride. In this latter case, the maleate is thermally or catalytically, partially or totally converted into the fumarate.
  b. A monoolefinic auxiliary dienophile is added, the reactivity of which is lower than, equal to or higher than that of the dienophiles of formula (I). This auxiliary dienophile is used in a proportion of 50:50 to 5:95 by weight, as referred to that of the dienophile of formula (I). Examples of these auxiliary dienophiles are given in the article of J. SAUER, H. WIEST, A. MIELERT, Ber. 97, (1964), 3183-3208, such as tetracyanoethylene, tricyanoethylene, 1,1-dicyanoethylene, vinylidene chloride, fumaryl chloride, fumarodinitrile, alkyl fumarates, maleic anhydride, citraconic anhydride, maleodinitrile, N-phenyl-maleimide, N-methyl-maleimide, transdibenzoylethylene, cis-dibenzoylethylene, dibenzoyl-acetylene, methyl acetylene-dicarboxylate, benzoquinone, and the like.
  c. Amongst the dienes, those with the greatest reactivity in the Diels-Alder reaction are selected. The trans-trans conjugated double bonds are more reactive than the cis-cis or cis-trans conjugated double bonds. When dienes of the latter type are to be used, they may be converted into compounds with trans-trans conjugated double bonds by thermal treatment at high temperature. To avoid cycloaddition reactions between dienes, it is preferable to carry out this isomerization at lower temperatures "in situ", in the presence of the dienophile, this isomerization being eventually catalyzed by minor amounts of iodine, sulfur or selenium.

When solution b) is adopted in order to reduce the amount of dienophile of formula (I)to be used, the final radiocurable composition according to the invention may contain, in addition to the Diels-Alder addition products of the invention (formula III), some Diels-Alder addition compound formed from the monoolefinic auxiliary dienophile. Radiocurable compositions including an amount of these compounds are meant to be included in the present invention.

PREPARATION of RADIOCURABLE COMPOSITIONS

To prepare the radiocurable compositions according to the invention, the mixtures of the abovementioned dienes and dienophiles are heated at temperatures between 80° and 140° C. for 1 to 20 hours, the length of the reaction time depending on the reactivity of the partners of the Diels-Alder reaction.

Higher temperatures and longer reaction times should be avoided in order to prevent premature gelification of the reaction products and of the dienophile by the initiation of radical polymerization and in order to prevent the reaction between two molecules of the conjugated diene, one of which acting as a dienophile.

The reaction may be carried out in the absence of solvents in the case of liquid reactants, even if they were only partially miscible. When the reactants are not liquid, the reaction may be carried out in the presence of solvents, such as chlorinated or nonchlorinated aliphatic or aromatic hydrocarbons (ethylene dichloride, chloroform, chlorobenzenes, etc.).

Generally the reaction is carried out in the absence of catalysts. However, it may be activated by the addition of Lewis acids, such as aluminium chloride.

To prevent the gelification of the reaction products during the synthesis, it is recommended to add known radical polymerization inhibitors, such as cuprous oxide, cuprous chloride, phenothiazine, hydroquinone and the like, the amount of inhibitor depending on the reaction time and temperature. If the amount of inhibitor does not exceed 5000 ppm, as referred to the reaction mixture, the inhibitor may be allowed to remain in the reaction product to increase the storage stability of the latter. If, however, the amount of inhibitor does exceed 5000 ppm, as referred to the reaction product, the excess inhibitor may be removed by known techniques.

If solvents had been used in the reaction, these are eliminated by known techniques suc as fractional distillation, evaporation in thin layer evaporators with ascending or descending films, or by entrainment with a current of inert gas.

If, as explained above, an auxiliary monoolefinic dienophile has been used, this is added at any suitable moment of the reaction, preferably towards the end thereof.

If this auxiliary dienophile has a relatively low boiling point, as is the case with vinylidene chloride, a sufficient excess thereof may be added to consume all the remaining dienic unsaturations and then the rest of the auxiliary dienophile may be separated by a simple distillation or by crystallization (e.g. in the case of tetracyanoethylene).

As it might occur that, after the Diels-Alder reaction, there still subsist in the radiocurable composition according to the invention some reactive groups such as COOH, OH or $>C=C<$ groups, use might be made thereof to modify the physical and chemical properties of said radiocurable compositions.

The free carboxyl groups (e.g. from a dienophile carrying free COOH groups) may be esterified with hydroxyl or epoxy compounds with a view to decreasing the acidity or hydrophilic character, to incorporating substituents increasing the gloss of the films prepared with these compositions or to incorporating groups which exerce a photochemical action.

The free hydroxy groups can be esterified or transesterified with organic acids, anhydrides, esters or acid chlorides. They can also be the sites of addition reactions with mono- or polyisocyanates, of reaction with dialkylsulfates and in general with all the substances liable to react with the active hydrogen of the hydroxyl group.

The acrylic $>C=C<$ groups can be partially converted into amine groups by addition of ammonia or primary or secondary amines.

USE of the RADIOCURABLE COMPOSITIONS

Because of the accumulation of the $>C=C<$ groups in the compositions according to the invention, these are readily and quickly polymerized by the action of electromagnetic (UV, gama or X rays) or corpuscular (accelerated electrons) irradiation. The compositions according to the invention may be used either alone or in admixture with other radiocurable compositions.

When electromagnetic irradiation is used for the photopolymerization, the compositions according to the invention are readily polymerized with gamma and X rays, but they are most particularly suitable for photopolymerization with ultraviolet (UV) irradiation having a wavelength between 200 and 500 nanometers, when photoinitiators and photosensitizers are added to accelerate the curing process.

Among the preferred photoinitiators and photosensitizers mention is particularly made of the ethers of benzoine (e.g. TRIGONAL 14 of the Dutch Company NOURY & van der LANDE), benzildialkylketals particularly benzildimethylketal, the oxime esters described in U.S. Pat. Specification No. 3,558,309, particularly 1-phenyl-1,2-propanedione 2-[0-(benzoly)oxime], alpha-halogenated acetophenones and their phenylanalogues, in particular p-tert.-butyl-α, α, α-trichloroacetophenone, desyl chloride and 4-chloromethylbenzophenone, the combination of ketones or alpha-diketones with molecules containing the p-dialkylaminobenzoyl group, a preferred example of which is Michler's ketone (p,p'-bis-(dimethylamino)-benzophenone); as examples of ketones and alpha-diketones there may be mentioned benzophenone, dibenzosuberone, acetophenone, benzil, furil and bornane dione. Further information on photoinitiators and photosensitizers can be found in the following references:

J. DELZENNE, Ind.Chim.Belge,24,(1959),739-764;

N.J. TURRO, Molecular Photochemistry, Benjamin Inc. New York 1967

When an irradiation of corpuscular nature is used, particularly a bombardment with accelerated electrons, the compositions according to the invention cure very quickly by the sole action of said acceleration electrons, i.e. in the complete absence of photoinitiators and/or photosensitizers. Consequently, the bombardment with accelerated electrons can be used just as well as the UV rays. Moreover, as the penetration power of accelerated electrons is higher than that of UV rays, the former can be specially used when the compositions of the invention have to be applied in greater thickness and/or when they contain pigments and fillers that might stop the electromagnetic irradiation and thus prevent complete polymerization in depth.

Sealers, adhesives, paints, varnishes and inks containing the radiocurable composition of the invention, which are to be cured by the action of an irradiation of corpuscular nature, in particular by bombardment with accelerated electrons have the following composition:

| | |
|---|---|
| radiocurable composition according to the invention | 10 to 95% by weight |
| additional unsaturated polymerizable monomers, oligomers and/or polymers | 0 to 90% by weight |
| inert polymers and plasticizers | 0 to 40% by weight |
| pigments and fillers | 0 to 60% by weight |
| conventional additives for sealers, adhesives paints, varnishes and inks curable by corpuscular irradiation | 1 to 10% by weight |

A particularly advantageous field of application of the compositions according to the invention is that of solventless sealers, adhesives, paints, varnishes, and inks which dry very quickly by the action of ultraviolet rays. In this considered application, the compositions according to the invention may be accompanied by conventional auxiliary substances such as reactive copolymerizable monomers, oligomers and/or polymers, inert nonpolymerizable polymers, inert or copolymerizable plasticizers, photosensitizers, photoinitiators, adjuvants such as waxes, mat rendering agents, anti-foam agents, flow agents, thixotropic agents, stabilizers against light and heat, antioxidants polymerization inhibitors to assure storage stability, pigments, dyestuffs, inorganic or organic fillers, fibrous or powdery strengthening agents, small amounts of solvents, photochemical reactivity improving agents (amines, alkanolamines, polyamines, chlorinated polyesters) and the like.

Among the various applications for which the radiocurable compositions according to the invention can readily be used, one of the most suitable is the manufacture of inks that are curable by UV rays (abbreviated as "UV inks"). These inks are applied in layers that are so thin that the pigments, dyestuffs and fillers contained therein absorb only a very slight amount of the emitted UV rays, the greatest part of the UV rays being available for the polymerization of the photopolymerizable binder therein at an extremely high rate of initiation.

The UV inks and their numerous advantages are well known from the patent literature and the technical and scientific publications. However the quality of the commercialized products has delayed their adoption by the graphic art industry and for the decoration of metallic and plastics packing material. In particular, certain commercial UV inks dry insufficiently, others do not have a sufficiently long storage stability or have a low adherence to metallic or plastic substrates. Most of the binders for UV inks have a bad wetting power for pigments and a rheological behavior that differs much from conventional inks, which necessitates special equipment, such as stirrers in the inkpots, to ensure the distribution of the ink on the inking rolls. A drawback which is found in most of the UV offset inks available at present is their bad offset behavior on the presses, induced by a disequilibrium in the hydrophile-lipophile balance of the binder, which results in imperfections in the printing sharpness due to a penetration of the water in the ink on the copper parts of the plates, a phenomenon known as tinting, or due to the dissolution or dispersion of the ink on the chromium or aluminum parts of the plate, a phenomenon known as greasing or scumming, or yet due to an increase in thickness on the flat tints of the plate.

A defect of most known UV varnishes and inks is their aggressiveness towards certain organs of the printing press or varnisher, such as the blankets (in offset printing), the inking rolls and the distribution rolls, the plates made of plastics material (in the case of flexographic inks), causing a certain swelling of the synthetic coating. This phenomenon is caused by the dissolving power of mono- or polyfunctional monomers or oligomers present in important amounts in the binder of these inks. Certain UV binders now in use UV offset inks, have a very high viscosity and need dilution with important amounts of these monomers of oligomers.

Finally, most of the known UV inks present difficulties during the de-inking of the printed paper by means of the conventional techniques. This is due to the excessive resistence to hydrolysis of the cross-linked film of ink.

According to the present invention, by carefully choosing the nature of the diene and dienophile and by taking certain precautions during their preparation as explained above, it is possible to obtain binders for UV inks wherein the abovementioned drawbacks are overcome, while still obtaining a very great reactivity at the same time as a good storage stability.

By the diversity of means at hand, it is possible to confection "tailor made" binders for UV inks with optimum properties for a given application. Thus, in order to obtain the desired binding power, pigment wetting, rheological behavior and offset character, one of the numerous fatty acids or their derivatives described above is chosen as the conjugated diene. Whereas, on choosing an alkyd or a polyester of a fatty acid with conjugated double bonds as the conjugated diene, a wide variety of formulations for the synthesis of alkyd resins become available, which as is known, are substances already used in the formulations of conventional inks. If however rosin derivatives are used according to the invention, physico-chemical and rheological characteristics can be given to the binders which are close to those of the known inks based on rosin.

As already mentioned above, the accumulation of acrylic radicals in the compositions according to the invention brings about a very great reactivity in the polymerization induced by photoinitiation. Thus in a drier equipped with four 80 W/cm UV lamps, the offset links formulated according to the invention readily attain speeds of polymerization which are higher than 450 m/minute. Moreover, because of the presence of residual olefinic double bonds in the diene part of the molecule, the UV inks according to the invention have the property of drying by slow oxidation, i.e. the films of ink show a favorable evolution of their resistance to scratching and to finger in function of time, when dried by UV irradiation.

The adherence of UV inks according to the invention to tin plate, aluminum and plastics material substrates depends on the nature of the diene and dienophile used. Thus, dienophiles which have been treated with epoxy compounds, amines, or phosphoric acid derivatives improve the adherence to metallic surfaces; on the other hand, the urethanization of the binders according to the invention improves the adherence to polyethylene surfaces.

As mentioned above, the aggressiveness of UV inks towards printing rolls, is often due to the diluents added to the inks to lower their viscosity. According to the present invention, non aggressive UV inks, presenting an adequate viscosity, can be formulated by the choice of non aggressive dienophiles or by limiting the content of free dienophiles by one or the other of the means mentioned therefore above.

Likewise, the de-inking of paper printed with the UV inks according to the invention can be improved by the choice of appropriate dienophiles, such as those containing phosphite, phosphate or amine radicals in their molecules or those derived from polyether- or polyester-polyols. On the contrary, the de-inking is more difficult when the binder for the UV ink contains unsaturated acrylic copolymers, polycarbonates, unsaturated polyurethanes, epoxy resins, silanes or siloxanes.

The sealers, adhesives, paints, varnishes and inks according to the invention, which are curable by the action of an irradiation of electromagnetic nature, in particular by UV rays have the following composition:

| | |
|---|---|
| radiocurable composition according to the invention | 10 to 95% by weight |
| additional unsaturated polymerizable monomers, oligomers and/or polymers | 0 to 90% by weight |
| inert polymers and plasticizers | 0 to 40% by weight |
| pigments and fillers | 0 to 60% by weight |
| photoinitiators and/or photosensitizers | 1 to 15% by weight |
| conventional additives for sealers, adhesives, paints varnishes and inks curable by electromagnetic irradiation, in particular by UV rays | 1 to 15% by weight |

The binder that dries by UV irradiation contains 10 to 95% by weight of the radiocurable composition according to the invention and 0 to 90% by weight of unsaturated monomers, oligomers and/or polymers generally used in UV inks, in particular with a view to modifying the rheological properties.

The inert polymers, plasticizers, pigments, fillers and all the additives are those conventionally used in UV inks.

The photoinitiators and photosensitizers are those already mentioned above.

When the sealers, adhesives, paints, varnishes and inks according to the invention have to be cured by the action of a bombardment with accelerated electrons, they have exactly the same composition as that described hereinabove for the UV irradiation, except for the omission of photoinitiators and/or photosensitizers.

The following examples are given for the purpose of illustrating the present invention. All parts are by weight unless otherwise stated.

EXAMPLE 1

700 g pentaerythritol triacrylate, 300 g china-wood (tung) oil (9.6 milliequivalents (abbreviated as meq) of double bonds per gram, measured by bromination; viscosity at 25° C = 2.40 poises), 200 g benzene and 1 g CuCl are introduced into a 2 liter three-necked round-bottomed flask, provided with a stirrer, a nitrogen admission tube and a reflux condenser. In this mixture, the dienophile:diene molar ratio is 8.2:1. A current of nitrogen is then passed in the turbid mixture (pentaerythritol triacrylate has only a low solubility in china-wood oil) which is heated to 110° C. After 95 minutes, 600 g are withdrawn from the mixture, which in the meantime has become homogenous even after cooling. This withdrawn fraction is called fraction A.

The fraction remaining in the flask is heated for another 95 minutes at the same temperature of 110° C, then heating is stopped. The second fraction is called fraction B. To each of fractions A and B, 600 ml benzene are added. They are washed twice with 300 ml of a 20% aqueous solution of NaCl. After decantation, the benzene solutions are dried over sodium sulfate and then filtered. To each of the benzene solutions, 0.2 g hydroquinone monomethylether (HQME) is added, the benzene is driven off by distillation under reduced pressure (15 mm Hg). The viscosity and coloration of the product thus obtained are measured:

Fraction A: viscosity = 56 poises (25° C); Gardner coloration = 10

Fraction B: viscosity = 207 poises (25° C); Gardner coloration = 11

EXAMPLE 2. (comparative)

a. the method of Example 1 is followed, but without addition of pentaerythritol triacrylate and while heating at 110° C. for 190 minutes, as for fraction B of Example 1. After treatment as in Example 1, an oily product is obtained, the viscosity of which is 2.70 poises at 25° C.

b. the method of Example 1 is followed but without addition of china-wood oil, while heating at 110° C. for 190 minutes as for fraction B of Example 1. After cooling, the viscosity of the product obtained is less than 100 centipoises at 20° C.

These Examples 2a and 2b show that the increase in viscosity observed for fractions A and B of Example 1 are due to the reaction between china-wood oil and pentaerythritol triacrylate.

EXAMPLE 3. (comparative)

The method of Example 1 is followed, but china-wood oil is replaced by the same weight of soya oil [soya oil does not contain conjugated double bonds and therefore does not correspond to the definition of a diene of formula (II)]. After heating for 190 minutes at 110° C. as in the preceding Examples, the product obtained on cooling separates out in 2 phases, the upper phase being soya oil. This soya oil has not undergone any modification and its infrared spectroscopy does not show any acrylic double bond.

This Example thus shows the necessity of using a conjugated diene to obtain a compound of formula (III) of the invention.

EXAMPLE 4. (comparative)

85 g of fraction B of Example 1 are heated under reflux with 1000 ml of a 10% alcoholic solution of KOH during 2 hours. The cooled solution is then poured into 3 liters water and the formed precipitate is separated by filtration.

On the other hand, the addition product of beta-eleostearic acid and acrylic acid is prepared according to the method described by H. P. KAUFMANN, H. GRUBER, H. BRUNING in Fette, Seifen, Anstrichmittel, 63, (1961), 633.

When the saponification product of fraction B of Example 1 is subjected to thin layer chromatography and the spot is isolated, it is found to correspond to the addition product of KAUFMANN et al., chosen as reference.

The identity of structure of these two compounds is further confirmed by mass spectrometry.

EXAMPLE 5.

425 g china-wood oil, 298 g 1,4-butanediol diacrylate and 2 g $Cu_2O$ are introduced into a 1 liter three-necked round-bottomed flask, provided with a stirrer and a nitrogen admission tube. In this mixture the dienophile:-diene molar ratio is 3:1.

A current of nitrogen is passed through the mixture at 110° C. for 90 minutes, then it is left to cool. 400 ml. dichloromethane are added and the obtained solution is filtered. The organic solution is washed twice with 300 ml of a 20% aqueous solution of $NH_4Cl$, dried over magnesium sulfate and filtered. 0.35 g of the polymerization inhibitor HQME are added and the solvent is driven off by distillation under reduced pressure (15 mm Hg).

The obtained product has a viscosity of 35 poises at 25° C and a Gardner coloration of 8.

In the obtained product 15.5% by weight of 1,4-butanediol diacrylate remain in the free state, which corresponds to a conversion of 62.5% by weight (this determination was made by gas chromatography).

In gel permeation chromatography a peak was identified, the molecular weight of which lies between 2020 and 2520 (as standardized against polystyrene), which corresponds to the addition products of 1 molecule of 1,4-butanediol diacrylate on two molecules of china-wood oil.

EXAMPLE 6.

a. Triacrylyl-pentaerythritol monomaleate.

2 kg. pentaerythritol triacrylate (PETIA product sold by UCB containing 4.1 equivalents OH), 200 g maleic anhydride, 2 g lithium carbonate (as catalyst) and 1.2 g hydroquinone monomethylether (as polymerization inhibitor) are introduced into a 3 liter round-bottomed flask provided with a stirrer. The mixture is heated to 90° C. for 150 minutes while stirring and is then left to cool. A solution is obtained containing 37% by weight of triacrylyl-pentaerythritol monomaleate in an excess of pentaerythritol triacrylate.

b. Triacrylyl-pentaerythritol monofumaromaleate.

600 g of the product obtained in a, 20 ml concentrated HCl and 1 g $Cu_2O$ are introduced into a round-bottomed flask provided with a stirrer. The mixture is heated under vigorous stirring at 120° C. for 2 hours, then the flask is connected to a source of vacuum (15 mm Hg) to remove by distillation: water, the isomerization catalyst (HCl) and a little acrylic acid set free by acidolysis. Nuclear magnetic resonance (NMR) analysis shows that 60% of the maleic unsaturation has been converted into fumaric unsaturation: (NMR) Analysis: Conditions: 60 Mc, Acetone, TMS. The maleate signals appear at $\delta = 6.39$ and 6.42 ppm whereas those of the fumarate appear at $\delta = 6.85$ (center of the band). The ratio of the maleate:fumarate surfaces after integration is 2:3.

c. formation of the Diels-Alder compound.

The product obtained in b is left in the flask but, instead of the connection to the vacuum source, a reflux condenser and a nitrogen admission tube are placed. 240 g of china-wood oil and 300 ml toluene are added and the mixture is heated at 116° C. for 3 hours. The obtained solution is treated as in Example 1. A product is obtained having a viscosity at 25° C of 285 poises and a Gardner coloration of 10.

EXAMPLE 7.

Example 5 is reproduced, but, in addition, 97 g (1 mole) vinylidene chloride is added. After treatment as in Example 5, the viscosity of the product thus obtained is 20 poises and the Gardner coloration is 11.

Gas chromatographic analysis shows that 19.3% by weight of 1,4-butanediol diacrylate remain in the free state in the resulting product, which corresponds to a conversion of 50.6%.

On the other hand, the analysis shows that the product contains 3% chlorine, which corresponds to a conversion of vinylidene chloride used in this Example of 32%.

EXAMPLE 8.

The method of Example 6 is followed, but pentaerythritol triacrylate is replaced by the same amount of the esterification product of 1 mole pentaerythritol with 2 moles acrylic acid, and 784 g (8 moles) maleic anhydride are added. The dienophile: diene molar ratio is 5.5:1.

The mixture is heated for 4 hours at 110° C. until titration of the acidity with an aqueous solution of KOH shows this to be 2.9 meq H+/g, which corresponds to a conversion of almost all the anhydride groups.

After isomerization with hydrochloric acid as in Example 6, a mixture of dimaleate, difumarate and maleofumarate of pentaerythritol diacrylate is obtained, wherein the fumaric:maleic group ratio is 3:2 according to the Nuclear magnetic resonance spectrum.

The Diels-Alder addition product is then prepared according to the method of Example 6, by reacting the pentaerythritol diacrylate maleate-fumarate addition product with china-wood oil. A viscous product is obtained (3200 poises at 25° C.) having a Gardner coloration of 9.

EXAMPLE 9.

The method of Example 1 is followed, but the chinawood oil is replaced by abietic acid. 4 g p-toluene-sulfonic acid are added to catalyze the equilibrium between abietic acid and levopimaric acid, which is more reactive than its isomer in the Diels-Alder reaction.

After 3 hours heating at 110° C. and after purification treatment according to the method of Example 1, the obtained product is a viscous liquid (1240 poises at 25° C.) having a Gardner coloration of 14.

EXAMPLES 10 to 16.

The method of Example 5 is followed but the 1,4-butanediol diacrylate is replaced by the same amount of the polyacrylates given in Table I below:

TABLE I

| Example | polyacrylate | time (h) | temp. (° C.) | viscosity (poises, 25° C) | Gardner colorat. |
|---|---|---|---|---|---|
| 10 | TERCAROL G 310 triacrylate d:d° = 4.2:1 | 1.5 | 130 | 32 | 8 |
| 11 | bis-triacrylyl pentaerythritol adipate d-d° = 7.0:1 | 1.5 | 135 | 53 | 8 |
| 12 | 1:1 addition product of maleic anhydride on bisphenol A diglycidyl ether diacrylate isomerized into fumarate d:d° = 4.5:1 | 1.8 | 130 | 540 | 10 |
| 13 | unsaturated polyacrylate[(1)] | 2.5 | 130 | 620 | 8 |
| 14 | diethylene glycol bis-(2-acryloxyethyl-carbonate) d:d° = 6.8:1 | 2 | 130 | 68 | 9 |
| 15 | trimethylolpropane diacrylate beta-dimethyl-aminopropanoate d:d° = 7.2:1 | 2.5 | 120 | 45 | 10 |
| 16 | tris-(2-acryloxyethyl) phosphite d:d° = 6.8:1 | 2 | 130 | 360 | 12 |

°dienophile:diene molar ratio
[(1)]the unsaturated polyacrylate was obtained by esterifying acrylic acid with an ethyl acrylate (80.1 moles %)/hydroxyethyl acrylate (15.4 moles %)/2-mercaptoethanol (4.4 moles %) copolymer having one terminal hydroxyl group with a yield of 82%. This copolymer has a molecular weight of 2300 and has an average of 3.7 acrylic double bonds per molecule.

EXAMPLE 17.

The following mixtures to be used as cross-linkable UV varnishes for metal plates are prepared (parts are by weight):

| 17 a | fraction B of Example 1 | 60 parts |
|---|---|---|
| | 1,4-butanediol diacrylate | 24 parts |
| | benzophenone | 5 parts |
| | triethanolamine | 10 parts |
| | polyethylene wax PA-520 (Hoechst) | 1 part |
| 17 b | product prepared in Example 6 | 60 parts |
| | 1,4-butanediol diacrylate | 24 parts |
| | benzophenone | 5 parts |
| | triethanolamine | 10 parts |
| | Polyethylene wax PA-520 (Hoechst) | 1 part |

Compositions 17a and 17b are spread on 0.12 mm thick undegreased tin plates by means of a 12 microns spiral bar-coater. These plates are placed on a carriage which passes in the focal plan of a 80 W/cm HANOVIA mean pressure mercury vapor lamp, fixed in the focus of a semi-elliptic reflector. The highest passage speed at which the polymerized film is no more tacky is recorded.

Varnish 17a is not tacky at a speed of 3.2 m/second and its pencil hardness is 1H; varnish 17b dries at a speed of 2.5 m/second and has a pencil hardness of 3H. Adherence is good in the Erichsen conical mandrel test.

EXAMPLE 18. Offset ink for sheet-fed press.

An offset ink, capable of drying under the influence of UV irradiation is prepared from the following components (parts are by weight)

| phthalocyanine blue (CI Pigment Blue 15) | 15 parts |
|---|---|
| unsaturated resin of Example 1, fraction B | 63 parts |
| trimethylolpropane triacrylate | 8 parts |
| dibutyl phthalate | 2 parts |
| benzophenone | 10 parts |
| Michler's ketone | 1 part |
| polyethylene wax PA-520 (Hoechst) | 1 part |

This mixture is ground at ordinary temperature on a 3 cylinder grinding mill. On a sheet-fed press, a design rich in flat tints is printed with this mixture on coated paper. Offset occurs at 5000 copies per hour with a single 80 W/cm Hanovia lamp. The ink resists in the test of fixation to the finger. The printed parts can be scratched with the nail immediately after drying, but after half an hour, they can no more be scratched. The sharpness and the general qualities of the printing are excellent. The ink has a rheological behavior which is such that the machine is even more easily regulated: the ink does not "sleep" in the inkpot, the correct water/ink balance is easily obtained and no increase in thickness is observed on the rolls.

EXAMPLE 19. Offset ink for web press.

An offset ink for web press for newspaper printing is prepared by grinding on a three-cylinder mill the following components (parts are by weight):

| AAMX benzidine yellow (CI Pigment Yellow 13) | 14 parts |
|---|---|
| unsaturated resin of Example 1, fraction A | 50 parts |
| unsaturated resin of Example 8 | 10 parts |
| trimethylolpropane triacrylate | 14 parts |
| dibutyl phthalate | 5 parts |
| benzil | 5 parts |
| Michler's ketone | 1 part |
| polyethylene wax PA-520 (Hoechst) | 1 part |

The yellow parts of a publicity photography are printed and dried with a single 80 W/cm Hanovia mercury lamp. Offset occurs at a speed of 3.5 m/second. The ink is well fixed in the finger test and can no more be scratched after 20 minutes. The behavior of the ink on the machines is excellent.

The ink is left on the machine without cleaning the rolls, and printing is taken up again the next day. After 2 minutes, the optimum printing qualities are again attained. The ink is not absorbed by the paper, which results in a uniform density of colour in the flat tints.

EXAMPLE 20. De-inking tests.

Black UV cross-linkable offset inks are prepared from the unsaturated resins prepared in Examples 1b, 6, 10, 11, 12, 13, 14, 15 and 16. These inks are prepared by grinding on three-cylinder mills the following ingredients (parts are by weight)

| | |
|---|---|
| "Channel" black (SPHERON 6) | 10 parts |
| unsaturated resin | 79 parts |
| benzophenone | 10 parts |
| Michler's ketone | 1 part |

With each of these inks, three 2 cm × 25 cm strips of Maine coated paper weighing 120 g/m² are printed by means of an IGT test printing press. After drying with an 80 W/cm Hanovia lamp provided with a semi-elliptic reflector, the strips of paper are fixed with adhesive tape onto a horizontal glass rod. After having attached thereto 1 g pieces of lead, they are dipped into a glass basin which contains a 2.5% aqueous NaOH solution.

The time is recorded which is necessary for about 90% of the ink film to be separated. The results obtained are given in Table II below:

TABLE II

| Ink containing the binder of Example | Mean time for 90% separation (min.) |
|---|---|
| 1 b | 35 |
| 6 | 37 |
| 10 | 30 |
| 11 | 25 |
| 12 | 40 |
| 13 | 50 |
| 14 | 45 |
| 15 | 20 |
| 16 | 22 |

EXAMPLE 21.

A 50micron film of the product obtained in Example 5 is poured on a glass plate. The film is cured by bombardment with accelerated electrons under the following conditions:

| | |
|---|---|
| electron accelerator | : type BBC, 300 KeV, 50 mA |
| dose rate | : 10 Mrad/sec |
| speed of passing past | : 70 m/minute, divided by Mrad dose |

Irradiation is carried out in inert atmosphere by flushing the surface with combustion gas.

The film is perfectly hard (90.5% insolubles in methyl ethyl ketone, hardness 1H) with a dose of 3.5 Mrad, which represents a linear speed of the film of (70/3.5) = 20 m/minute.

We claim:

1. A radiation-curable composition which comprises a Diels-Alder reaction product between at least one dienophile (A) having the formula $$Z-CH=CH-COOY(OCOCH=CH_2)_n$$
$$|$$
$$(OH)_x$$

wherein Z is hydrogen or COOH, Y is the radical of a polyhydric compound having a molecular weight lower than 3000 containing 2 to 6 hydroxyl groups, $n$ is 1 to 5, and $x$ is 0 to 4, and at least one diene (B) group consisting of a glyceride of an unsaturated fatty acid containing conjugated double bonds.

2. The radiation-curable composition of claim 1, wherein the polyhydric compound is ethylene glycol, butanediol, glycerol, trimethylolpropane, pentaerythritol or an addition product thereof with an alkylene oxide.

3. The radiation-curable cmposition of claim 1, wherein the polyhydric compound is pentaerythritol adipate, a semitelechelic acrylic copolymer carrying hydroxyl groups or the diglycidyl ether of 2,2-bis-(4-hydroxyphenyl)-propane.

4. The radiation-curable composition of claim 1, wherein the dienophile (A) is an alkylene glycol bis-(2-acryloxyethylcarbonate), an acryl derivative of a tertiary amine, an acryloxyalkyl phosphite or an acryloxyalkylphosphate.

5. The radiation-curable composition of claim 1, wherein said glyceride of unsaturated fatty acid containing conjugated double bonds is tung oil.

6. The radiation-curable composition of claim 1, wherein the dienophile (A) additionally comprises a monoolefinic auxiliary dienophile, the ratio by weight auxiliary dienophile:dienophile (A) being 50:50 to 5:95.

7. The radiation-curable composition of claim 6, wherein the monoolefinic auxiliary dienophile is a member selected from the group consisting of tetracyanoethylene, tricyanoethylene, 1,1-dicyanoethylene, vinylidene chloride, fumaryl chloride, fumarodinitrile, an alkyl ester of fumaric acid, maleic anhydride, citraconic anhydride, maleodinitrile, N-phenyl-maleimide, N-methyl-maleimide, trans-dibenzoylethylene, dibenzoylacetylene, methyl acetylenedicarboxylate, cis-dibenzoylethylene and benzoquinone.

8. A process for the preparation of a radiation-curable composition according to claim 1, which comprises heating the dienophile (A) with the diene (B) in a molar ratio of diene to dienophile of 1:1 to 1:10 at a temperature between 80° and 140° C for 1 to 20 hours.

9. The process of claim 8, wherein the molar ratio of diene to dienophile is 1:3 to 1:9.

10. The process of claim 8, wherein the reaction is carried out in the absence of solvents when the dienophile (A) and the diene (B) form a liquid mixture at ambient temperature.

11. The process of claim 8, wherein the reaction is carried out in the presence of solvents when the dienophile (A) and the diene (B) form a solid mixture at ambient temperature.

12. The process of claim 11, wherein the solvent is a member selected from the group consisting of aliphatic hydrocarbons, aromatic hydrocarbons, chlorinated aliphatic hydrocarbons and chlorinated aromatic hydrocarbons.

13. The process of claim 8, wherein the reaction is carried out in the presence of a Lewis acid as a catalyst.

14. The process of claim 8, wherein a monoolefinic auxiliary dienophile is added at any moment to the reaction mixture.

15. The process of claim 14, wherein the monoolefinic auxiliary dienophile is added towards the end of the reaction.

16. The process of claim 14, wherein the monoolefinic auxiliary dienophile has a low boiling point and is added to the reaction mixture in sufficient excess to consume all the remaining dienic unsaturations, the remaining monoolefinic auxiliary dienophile being separated by distillation or crystallization.

17. Varnishes, paints or inks curable by bombardment with accelerated electrons comprising the radiation-curable composition of claim 1.

18. In a varnish, paint or ink composition curable by bombardment with accelerated electrons, comprising a radiation curable composition and conventional additives for varnishes, paints or inks, the improvement wherein the radiation curable composition is the composition of claim 1.

19. In a varnish, paint or ink composition curable by irradiation with ultraviolet rays, comprising a radiation curable composition, and a photoinitiator or photosensitizer and mixtures thereof in conjunction with conventional additives for said varnish, paint or ink composition, the improvement wherein the radiation curable composition is the composition of claim 1.

* * * * *